United States Patent [19]

Tigner et al.

[11] 4,352,046
[45] Sep. 28, 1982

[54] NON-TACTILE SWITCH

[76] Inventors: Thomas E. Tigner, 1208 Poplar St., Nelsonville, Ohio 45764; Charles R. Parker, 11 Blick Ave., Athens, Ohio 45701

[21] Appl. No.: 112,935

[22] Filed: Jan. 17, 1980

Related U.S. Application Data

[63] Continuation of Ser. No. 37,027, May 8, 1979, abandoned.

[51] Int. Cl.³ ............................................. H05B 37/02
[52] U.S. Cl. .................................... 315/362; 307/117; 307/118; 250/229; 315/156; 315/159
[58] Field of Search ............... 315/362, 119, 127, 151, 315/156, 159; 307/311, 118, 117; 250/229, 231 P; 362/810

[56] References Cited

U.S. PATENT DOCUMENTS 3,479,561 11/1969 Janning ........................... 315/362 X
4,065,669 12/1977 Bogel .............................. 307/311 X

FOREIGN PATENT DOCUMENTS 2512335 9/1978 Fed. Rep. of Germany .

Primary Examiner—Eugene R. LaRoche
Attorney, Agent, or Firm—Mueller and Smith

[57] ABSTRACT

Switching apparatus for energizing a load from an a.c. current source where the apparatus is actuated to an "on" condition by the application of a source of light, such as a match. A photo-responsive, solid-state element such as a light actuable SCR is mounted within the apparatus at the end of a passageway of length and width selected to preclude an influence of ambient lighting. The "on" condition of the device is sustained through the utilization of a feedback light path, the source of which is an incandescent lamp. Switching "off" the apparatus is carried out by blowing on an opaque flap from a rest to a transient position temporarily blocking the feedback light path.

12 Claims, 12 Drawing Figures

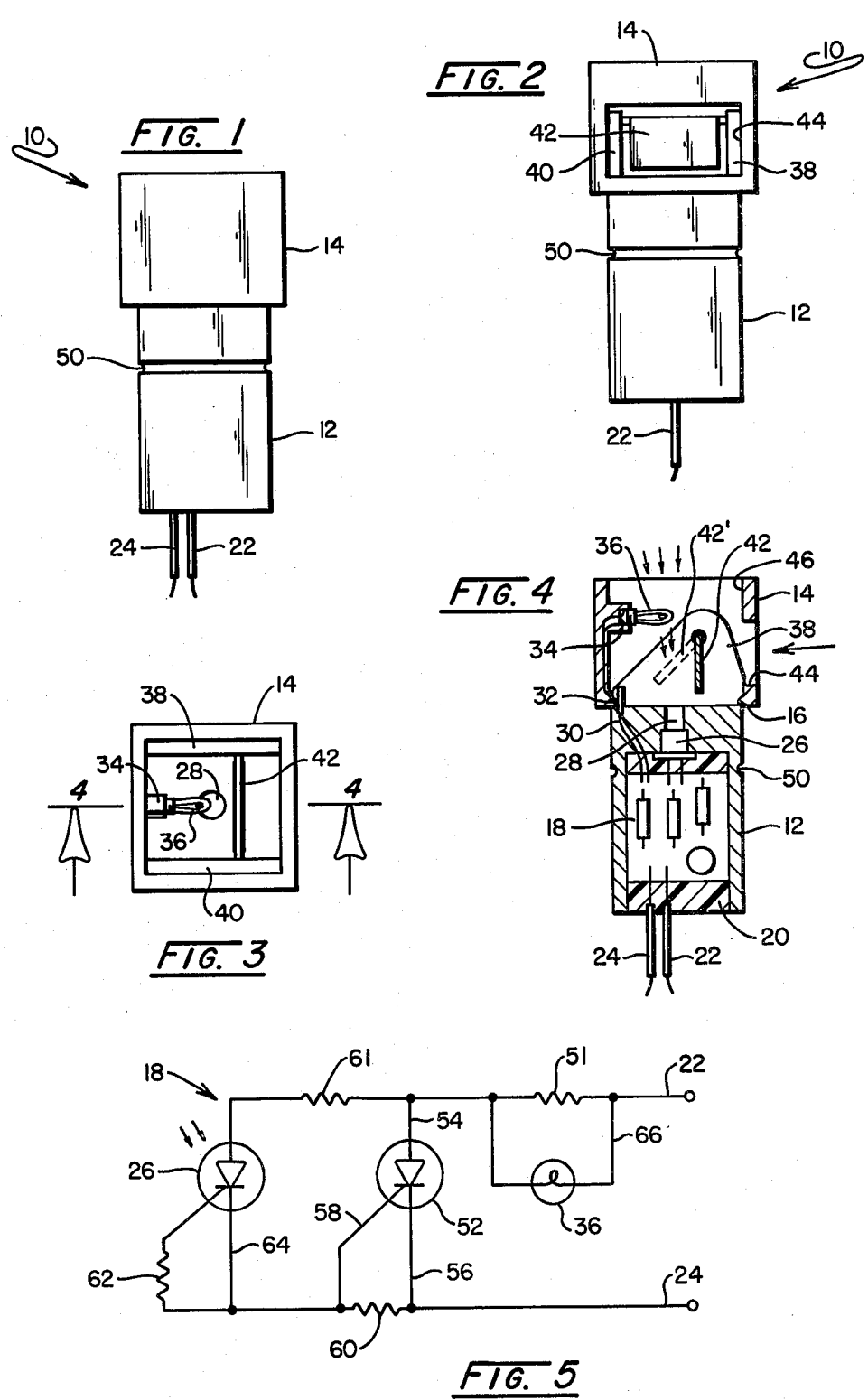

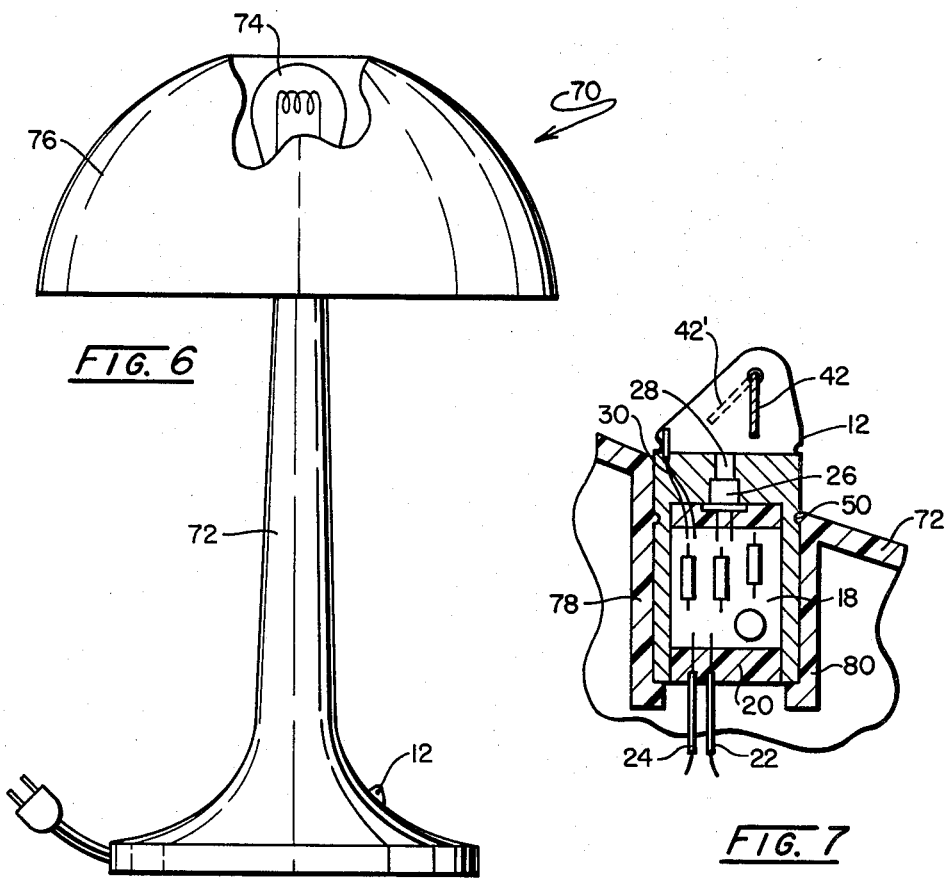
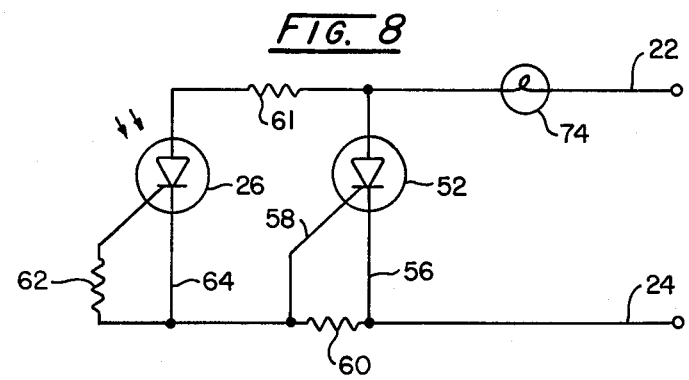

4,352,046

NON-TACTILE SWITCH

This is a continuation of the application Ser. No. 037,027, filed May 8, 1979, abandoned.

BACKGROUND OF THE INVENTION

A broad variety of uses have been developed for electrical switches which are actuable between on and off states without resort to touching. These uses are associated with safety for applications wherein the touching of a switch may lead to dangerous shorting; or health applications wherein the physically disabled may have no use of their limbs and must rely on breath to actuate a switch. Further, such switches find applications in a variety of novelty items. Particularly where light and/or breath actuated switches are concerned, the production thereof has been limited to relatively low volumes, considerations of costs and compactness not being predominant factors in this design. For example, where lights or appliances are powered from typical alternating current sources, the switching circuits which are actuated from a light source generally resort to the use of full wave rectifiers, transformers and the like to derive a direct current environment within which solid-state components may be operated to carry out switching logic. While such switching devices are effective, their weight, volume or bulk and, particularly, their cost preclude adaptation to a broad variety of applications.

One difficulty encountered in the development of lower cost light actuated switches resides in providing adequate switching sensitivity under a relatively wide range of ambient lighting conditions. Generally, it is desirable that such switching devices operate in response to the impingement thereon of relatively low intensity light; for example, the light from a common match. This light sensitivity should be operationally available while the devices remain immune to effects of a broad range of ambient lighting. Switching capability should extend from operation within a darkened room to typically encountered daylight conditions. To remain fabricable at lower costs, such switching sensitivity and ambient light immunity should be available without resort to complex ambient light compensatory circuits. Where light actuated switches can be provided which are highly compact and inexpensive while remaining adequately sensitive, a wide spectrum of new applications will be witnessed.

SUMMARY OF THE INVENTION

The present invention is addressed to a compact, low cost switching device which serves to energize a load from an alternating current source in response to an applied source of light and which may be switched off by a current of air derived, for example, by blowing. Each embodiment of the switching device utilizes a light responsive solid-state component such as a photoresponsive silicon controlled recitifier (SCR) which is mounted in a manner achieving an operation which is immune from a broad range of ambient lighting effects. The switch can be turned on utilizing a light source of intensity as low as that of a match and under ambient conditions ranging from a darkened room to one illuminated under daylight conditions. This switching sensitivity, combined with ambient illumination immunity is achieved without resort to complex circuitry, but through the mounting of the sensing device within a switch housing such that it resides at the end of a passageway of predetermined dimensions. As a consequence, only direct light from an actuating source is permitted to impinge upon the light sensitive switching device, diffuse ambient illumination being effectively blocked from the light sensitive element of the switch.

The device of the invention utilizes a feedback light path to achieve continued energization and that light path may be derived from a load present as a conventional incandescent bulb or from a small "grain of wheat" type incandescent bulb which is so positioned within the switching apparatus as to illuminate the light sensitive element within the noted passageway following an initial actuation of the switch. To turn the switching device off, a small opaque flap is mounted adjacent that passageway and may be blown to move from a stable position of rest to an unstable, transient position temporarily blocking the passage of light from the incandescent lamp to the passageway. This action serves to cause the switch immediately to assume an off condition. To achieve high sensitivity, an operational combination with low current demands is utilized providing two silicon controlled rectifiers, one being light sensitive and positioned as above-described which serves to gate the second into a conductive state for energizing a load.

Other objects of the invention will, in part, be obvious and will, in part, appear hereinafter.

The invention, accordingly, comprises the apparatus possessing the construction, combination of elements and arrangement of parts which are exemplified in the following detailed disclosure.

For a fuller understanding of the nature and objects of the invention, reference should be had to the following detailed description taken in connection with the accompanying drawings.

BRIEF DESCRIPTION OF THE DRAWINGS

FIG. 1 is a side elevational view of a switching apparatus according to the invention;

FIG. 2 is a front elevational view of the switching apparatus of FIG. 1;

FIG. 3 is a top view of the switching apparatus of FIG. 1;

FIG. 4 is a sectional view of the switching apparatus of FIG. 3 taken through the plane 4—4 therein;

FIG. 5 is a circuit diagram of one embodiment of the switching apparatus of the invention;

FIG. 6 is a front view of a light fixture incorporating switching apparatus according to the invention;

FIG. 7 is a fragmentary sectional view of switching apparatus according to the invention;

FIG. 8 is a diagram of a circuit utilized with the switching apparatus embodiment of FIGS. 6 and 7;

DETAILED DESCRIPTION OF THE DRAWINGS

Figure 9:
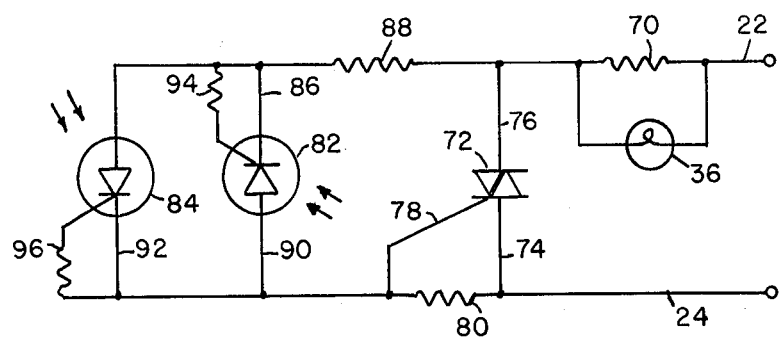
FIG. 9 is a circuit diagram of another embodiment of the switching apparatus of the invention similar to that shown in FIG. 5 but representing a full wave version thereof.

Referring to FIGS. 1 through 4, the general structure of one switch apparatus according to the invention is revealed generally at 10. Apparatus 10 includes a housing having upper and lower components 12 and 14, component 14 being structured in the nature of a cap which is retained upon component 12 by a snap fitting part which is represented at bead 16. Components 12 and 14 may be formed of plastic, component 12 particularly being fashioned of a material opaque to light. As shown in FIG. 4, lower component 12 carries a circuit 18 which is "potted" or encapsulated within an opaque resin represented at 20. Input leads 22 extend into circuit 18 which further incorporates a light actuable silicon control rectifier (SCR) 26 which is positioned adjacent to a passageway 28 extending through lower housing portion 12 to an upwardly disposed circular opening as seen in FIG. 3. Also extending through housing portion 12 are leads 30 which are provided pressure contacts at 32 which additional leads extend through upper portion 14 to a small socket 34. Socket 34 serves as a mount for a small, "grain of wheat" type of incandescent lamp 36. Note that the filament of lamp 36 is somewhat aligned with the axis of the straight passageway 28 leading to the photo-active surface of SCR 26.

Lower housing portion 12 additionally is formed having two spaced upstanding flange portions 38 and 40 which support an opaque flap 42, the upper edge of which is formed to define an axle which extends through corresponding openings within spaced flanges 38 and 40. Thus configured, flap 42 is capable of pivotally moving about its mounting to the position shown at 42' in FIG. 4. Movement of flap 42 is by a current of air which is expressed through an opening 44. For the embodiment shown, switch apparatus 10 is intended to be substantially vertically mounted such that flap 42 moves from a correspondingly vertically and gravitationally oriented stable position as shown in solid line form in FIG. 4 to the transient, unstable position 42'. The short transient interval wherein the flap blocks the opening of passage 28 is regulated by the duration, for example, of a breath of air. Upper portion 14 additionally is formed having an upwardly disposed opening 46 through which a source of illumination such as a match or flashlight may communicate in light transfer relationship with passage 28 and, thus, with light actuable SCR 26. Assembly 10 additionally is shown incorporating a peripheral groove 50 which is provided to permit its snap-in mounting within an appliance or the like.

Turning to FIG. 5, the circuit 18 is revealed. Input leads 22 and 24 are connectible with an alternating current source as conventionally available and the switching arrangement of the circuit is utilized to selectively energize a load represented as resistor 51 connected within lead 22. Current is switched into load 51 by a solid-state switch present as a higher capacity silicon controlled rectifier (SCR) 52, the anode of which is connected through line 54 to lead 22, and the cathode of which is coupled through line 56 to lead 24. The gate of SCR 52 is coupled through line 58 to one side of a conventional pull-down resistor 60. SCR 52 is selectively gated into conduction by virtue of its association with a light actuable SCR 26 connected between leads 22 and 24 on one side of limiting resistor 61. The gate of SCR 26 is coupled through pull-down resistor 62, as well as its cathode through line 64, to the gate input of SCR 52. With the arrangement shown, the highly light sensitive SCR 26, upon exposure to adequate illumination, serves to gate SCR 52 into conduction. Inasmuch as alternating current is present as the power source at leads 22 and 24, only the half cycle componet of that current is switched through load 51. To maintain a conductive status, therefore, grain of wheat bulb 36 is connected by line 66 in parallel with load 52. Returning to FIG. 4, it may be seen that SCR 26 may be actuated into conduction by positioning a light such as a match or flashlight beam over opening 46. The direct light path then illuminates SCR 26 through passageway 28 to, in turn, switch on SCR 52 and illuminate bulb 36 while energizing load 51. Because bulb 36 is incandescent, it will continue to glow during unenergized half cycles of energizing drive to load 51. Thus, light actuable SCR 26 will continue to serve to gate SCR 52 into conduction. As is apparent, any transient interruption of the light path from bulb 36 through passageway 28 will serve to turn off SCR 26 and additionally, SCR 52. With the present invention, a current of air expressed through opening 44 will cause flap 42 to pivot from its static or rest position shown in solid line fashion in FIG. 4 to the position shown in phantom at 42', a position wherein light from bulb 36 as well as from opening 46 is blocked. This action serves to turn the switch apparatus "off".

As is apparent, it is important that the photo response of SCR 26 remain immune from gating by ambient illumination. Passageway 28 is structured specifically to avoid such unwanted ambient light influence. In this regard, it has a length and widthwise dimension such that diffuse ambient light substantially does not reach the reactive surface of SCR 26. On the other hand, the direct illumination occasioned by light from lamp 36 or start-up light through opening 46 readily passes through passageway 28 and to SCR 26. It has been determined that a length of 5/16 inch and diameter of $\frac{1}{8}$ inch for passageway 26 provides for proper operation of the circuit without influence from ambient sources. This avoidance of ambient light influence is developed to an extent wherein only very low direct light levels are required at opening 46 to turn the switch on. For example, a common match will cause circuit 18 to assume an on switched condition. The type solid-state components utilized in the circuit may be conventional, for example, SCR 26 may be present as a type L9B marketed by General Electric Company, while SCR 52 may be present as a type C106B1 marketed by the same organization. While photo activated SCRs may be utilized in and of themselves for the switching purpose, the dual arrangement utilizing a power SCR 52 in combination with a photo SCR 26 permits the switching of reasonably heavy loads without resort to heat sink structures and the like otherwise required for the switching unit.

Where the load represented at 51 is present as an incandescent type filament, it itself may be utilized to sustain the on condition of the switch by positioning the assembly 10 in an orientation wherein direct light from that load is incident upon passageway 28. Where ligth sources which do not have a glowing property are utilized, for example, fluorescent or neon sources, the sustaining light input of bulb 36 becomes necessary.

Referring to FIGS. 6–8, an application of the switching arrangement to a novelty item present as a lamp 70 is portrayed. Lamp 70 may be structured having any desired ornamental configuration and generally will include a base 72 having a socket supporting an incandescent lamp 74 over which may be positioned a shade or the like 76. As shown in FIG. 7, positioned within base 72 at a location selected for influence by light emanating from bulb 74 is a switch housing lower portion as described at 12 in FIGS. 1-5. In the arrangement shown, the upper or cap portion 14 of the switch is not utilized inasmuch as the assembly positioned with respect to bulb 74 is such as to permit the latter to carry out continuous gating of SCR 26 through passageway 28. The circuit 18 utilized in the application shown at 70 does not incorporate the grain of wheat bulb 36 in parallel circuit relationship with the load, that load now being shown in the figure as lamp 74. To light lamp 70, a match is struck and held in the vicinity of passageway 28. This gates SCR 26 to, in turn, cause the gating of SCR 52 and the conduction of the half cycle component of a.c. current through the filament of bulb 74. Bulb 74 lights and sustains the on condition of SCR 26. Lamp 70 is de-energized by blowing against flap 42 such that it moves from the stable rest position shown in solid line fashion to the transient or unstable condition represented in phantom at 42'. As indicated earlier, only a short interruption of feedback light from lamp 74 passing through passageway 28 is required to turn the switch off.

The mounting of housing portion 12 within base 72 is revealed in FIG. 7 as being one wherein a receiving cavity is fashioned having downwardly depending walls 78 and 80. The walls permit the mounting of housing portion 12 in an orientation wherein passage 28 is aligned vertically beneath bulb 74. This permits appropriate direct illumination from bulb 74 as well as a proper gravitationally induced orientation for the rest position of flap 42. Concerning the latter implement, it will be apparent that opaque flap 42 may be coupled within the assembly utilizing a variety of techniques, the function thereof required being one wherein the flap has a normal rest position permitting the impingement of light upon the opening of passageway 28 and having a transient unstable position to which it may move under the influence of a current of air. Exemplary of other arrangements, the flap may be coupled within the assembly utilizing a resilient, spring like material which permits its movement to an unstable position and its recovery to a normal stable position. Such an arrangement will find use in nonvertical mountings of the assembly.

Looking to FIG. 9, a full wave version of the circuit shown and described in connection with FIG. 5 is revealed. Input leads 22 and 24 again are shown which are connectable with an alternating current source as is conventionally available and the switching arrangement of the circuit is utilized to selectively energize a load represented as resistor 70 connected within lead 22. Current is switched into load 70 by a triac 72 of any of the currently available varieties. The input terminals of triac 72 are coupled between leads 22 and 24 by lines 74 and 76, while the gate thereof is coupled through line 78 to one side of a pull-down resistor 80. In conventional fashion, triac 72 provides full wave a.c. switching for load 70 inasmuch as it is capable of conducting in both directions (all four quadrants) with positive or negative gate current.

The gating of triac 72 is carried out by two light actuable SCRs 82 and 84 which are both positioned so as to remain under the influence of grain of wheat bulb 36 when that bulb is energized. Thus, some modification of the arrangement shown connection with FIGS. 1-4 is required for the instant embodiment. The cathode of photo SCR 82 is coupled through line 86 to lead 22 at one side of a limiting resitor 88, while the anode thereof is coupled to lead 24 through line 90. Conversely, the anode of photo SCR 84 is coupled to lead 22, while the cathode thereof is coupled through line 92 to lead 24. The gate of photo SCR 82 is coupled through pull-down resistor 94 to lead 22, while the corresponding gate of photo SCR 84 is coupled through pull-down resistor 96 to lead 24.

With the arrangement shown, as light is applied to both photo SCRs 82 and 84, they are turned on to conduct on opposite cycles. For example, on the positive half cycle, SCR 84 will conduct to assert a gate voltage upon triac 72, while upon the negative half cycle, photo SCR 82 conducts to gate triac 72. Photo SCRs 82 and 84 will remain on due to the energization of bulb 36. Thus, load 70 is energized until such time as the light from grain of wheat bulb 36, as it impinges upon photo SCRS 82 and 84, is interrupted.

Figure 10:
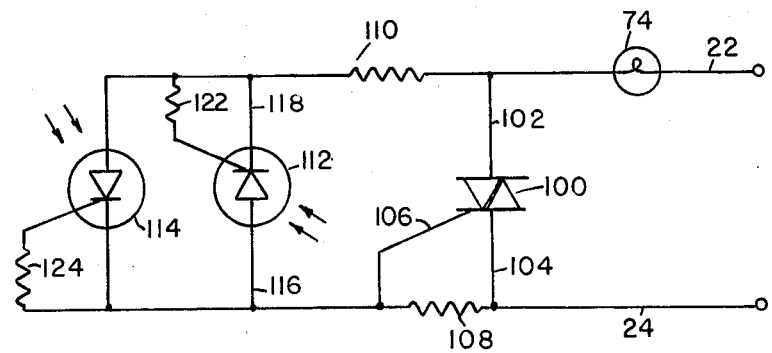
FIG. 10 is a circuit diagram of another embodiment of the switching apparatus of the invention similar to that shown in FIG. 8 but representing a full wave version thereof.

Looking to FIG. 10, a full wave version of the circuit embodiment of FIG. 8 is revealed. As in the embodiment of FIG. 8, the principal load is an incandescent lamp 74 which is reproduced in the drawing. The remainder of the circuit is identical to that shown in FIG. 9, a triac 100 being coupled by lines 102 and 104 between leads 22 and 24 and having a gate at line 106 extending to lead 24 at one side of a pull-down resistor 108. A limiting resistor 110 is positioned within lead 22 at one side of line 102 and at the opposite side thereof light actuable SCRs 112 and 114 are coupled between leads 22 and 24. In this regard, photo SCR 112 is coupled through lines 116 and 118 to respective leads 24 and 22, while photo SCR 114 is coupled through line 120 to lead 24 and its anode is coupled to lead 22. The gate of photo SCR 112 is coupled through pull-down resistor 122 to lead 22, while the corresponding gate of photo SCR 114 is coupled through pull-down resistor 124 to lead 24. As is apparent, the operation of the circuit of FIG. 10 is identical to that of FIG. 9 with the exception that incandescent bulb 74 must be so positioned as to maintain this on condition of both photo SCRs 112 and 114. Switching off is carried out, as discussed in connection with the embodiment of FIG. 8, by interrupting the flow of light to the photoresponsive elements.

Figure 11:
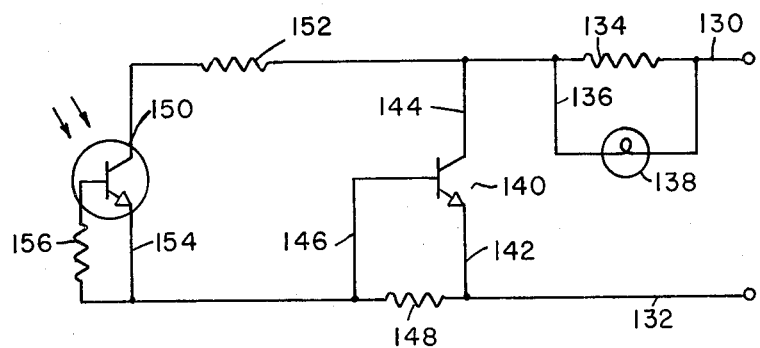
FIG. 11 is a diagram of a circuit utilized with the switching apparatus of the invention representing a version of the circuit of FIG. 5 operating with a D.C. source.

Turning to FIG. 11, a D.C. version of the circuit embodiment shown in FIG. 5 is revealed. In the figure, leads 130 and 132 are represented as connectible to a d.c. source, lead 130 being coupled with a load represented by resistor 134. Connected in parallel around resistor 134 by line 136 is a grain of wheat bulb 138 which, as in the earlier embodiments, is energized with the energization of load 134. D.C. power is switched to load 134 by a transistor 140, the emitter of which is connected through line 142 to lead 132, while the collector thereof is coupled to lead 130 by line 144. The base of transistor 140 is coupled through line 146 to lead 132 at one side of a pull-down resistor 148. Transistor 140 is turned on by bias asserted through the turning on of photo-transistor 150, the collector of which is coupled to lead 130 at one side of a current limiting resistor 152, and the emitter of which is coupled through line 154 to lead 132. The base of photo transistor 150 is coupled through resistor 156 to lead 132. With the arrangement shown, with the application of a light source to photo-transistor 150, it becomes forwardly biased to, in turn, turn on transistor 140 and energize load 134 as well as grain of wheat bulb 138. The light from grain of wheat bulb 138 maintains the on condition of photo-transistor 150 until it is interrupted.

Figure 12:
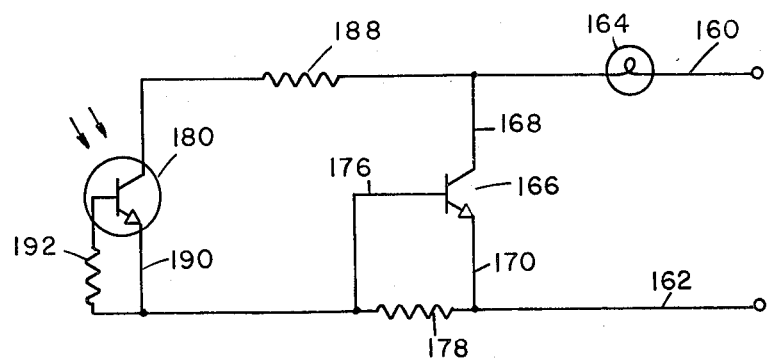
FIG. 12 is a circuit diagram of another embodiment of the switching apparatus of the invention similar to that shown in FIG. 8 but utilizing a D.C. voltage source.

Looking to FIG. 12, a d.c. version of the embodiment of FIG. 8 is revealed, leads as at 160 and 162 being shown arranged for connection with a d.c. source. An incandescent lamp operable with d.c. current at 164 is shown coupled within lead 160 and is switched into an energized state by transistor 166. The collector of transistor 166 is coupled through line 168 to lead 160, the emitter thereof is coupled through line 170 to lead 162 and the base thereof is coupled through line 172 to lead 162 at one side of a pull-down resistor 178. Transistor 166 is turned on with the corresponding turning on of photo-transistor 180. In this regard, the collector of photo-transistor 180 is connected to lead 160 through limiting resistor 188, the emitter thereof is coupled through line 190 to lead 162 and the base thereof is connected through resistor 192 to lead 162. As before, incandescent lamp 164 should be so positioned such that the light therefrom will effect the turning on of photo-transistor 180. To activate the circuit, a light is brought into the range of influence of photo-transistor 180, to turn it on and thus turn on transistor 166, to, in turn, energize lamp 164. The light from lamp 164 then sustains the on condition at photo-transistor 180 until it is interrupted.

It will be apparent to those artskilled, that the embodiments of FIGS. 11 and 12 would be equally operable with an a.c. source should transistors as at 140 and 166 be available having adequate break-down voltage characteristics.

Since certain changes may be made in the above-identified apparatus without departing from the scope of the invention herein involved, it is intended that all matter contained in the description thereof or shown in the accompanying drawings shall be interpreted as illustrative and not in a limiting sense.

We claim:

1. Switching apparatus for selectively energizing a load from an alternating current source comprising:
    a circuit connectible with said source including solid-state switching means gateable into a conductive state to energize said load with a half-wave component of said source, a light actuable silicon controlled rectifier coupled in gating relationship with said solid-state switching means and an incandescent lamp coupled with said solid-state switching means and energizable thereby from said source simultaneously with the said energization of said load; and
    housing means for retaining said circuit and having a portion opaque to light adjacent said light actuable silicon controlled rectifier, said opaque portion having an open passageway extending from an opening in said housing to said light actuable silicon controlled rectifier and having lengthwise and widthwise dimensions for attenuating diffuse ambient light incident upon said opening to an extent precluding an actuation of said light actuable controlled rectifier thereby, means for mounting said incandescent lamp at a location spaced from said passageway and aligned therewith for actuating by illumination generated thereby said light actuable silicon controlled rectifier both during positive going and negative going half cycles of said source, and an opaque flap mounted between said lamp and said opening and actuable by a current of air to move from a stable rest position to an unstable position over said opening and intermediate said opening and said lamp to effect a transient blockage of light from said lamp incident upon said opening to effect de-energization of said load.

2. The switching apparatus of claim 1 in which said solid-state switching means is a silicon controlled rectifier.

3. The switching apparatus of claim 1 in which said housing is configured having a first opening axially aligned with said passageway for receiving light from an external source and includes a second opening through which said current of air may be directed to impinge upon said flap.

4. The switching apparatus of claim 1 in which said passageway lengthwise extent is about 5/16 inch and said widthwise dimensions is about ⅛ inch.

5. The switching apparatus of claim 1 in which said flap is pivotally mounted upon said housing and extends from said pivotal mounting toward a location adjacent said opening.

6. Apparatus for switching an incandescent lamp between on and off conditions, comprising:
    circuit means connectible through first and second inputleads to a source of alternating current and including a silicon controlled rectifier having its anode connected with said first lead and its cathode and gate connected with said second lead and gateable to an on condition, to pass half wave components of said current to said lamp, and a light actuable silicon controlled rectifier energizable from said first and second leads, coupled with said gate and actuable in the presence of light to gate said silicon controlled rectifier to said on condition; and
    a housing retaining said circuit means and having a portion opaque to light adjacent said light actuable silicon controlled rectifier, said opaque housing portion being formed to define an open passageway extending from an opening in said housing to said light actuable silicon controlled rectifier, said passageway having lengthwise and widthwise dimensions for attenuating diffuse ambient light incident upon said opening and to an extent precluding actuation of said light actuable silicon controlled rectifier, by said ambient light, an opaque flap mounted adjacent said opening and movable from a gravitationally biased stable rest position not blocking said opening to an unstable position over said opening to effect a blockage of light from said lamp incident upon said opening, said housing being configured for access to said flap by blowing air thereupon to effect said movement to said unstable position to effect de-energization of said lamp and for exposing said opening and passageway to illumination from said lamp when said flap is in said rest position to maintain said actuation of said light actuable silicon controlled rectifier.

7. The apparatus of claim 6 in which said passageway is formed having a lengthwise dimension of about 5/16 inch and a widthwise dimension of about ⅛ inch.

8. Switching apparatus for selectively energizing a load from an alternating current source comprising:
    a circuit connectible with said source including triac switching means gateable into a conductive state to energize said load, a first light actuable silicon controlled rectifier coupled in gating relationship with said triac switching means for a first half wave component of said source, a second light actuable silicon controlled rectifier coupled in gating relationship with said triac switching means for a next opposite half wave component of said source and a lamp coupled with said triac switching means and energizable thereby from said source simultaneously with the said energization of said load; and housing means for retaining said circuit and having a portion opaque to light adjacent said first and second light actuable silicon controlled rectifiers, said opaque portion having an open passageway extending from an opening in said housing to said first and second light actuable silicon controlled rectifiers and having lengthwise and widthwise dimensions for attenuating diffuse ambient light incident upon said opening to an extent precluding an actuation of said first and second light actuable silicon controlled rectifiers thereby, means for mounting said lamp at a location spaced from said passageway opening and positioned with respect to said passageway for actuating by illumination said first and second light actuable silicon controlled rectifiers, and an opaque flap mounted between said lamp and said opening and actuable by a current of air to move from a stable rest position to an unstable position over said opening to effect a transient blockage of light from said lamp incident upon said opening.

9. Switching apparatus for selectively energizing a load from a direct current source comprising:

a circuit connectible with said source including transistor switching means having collector and emitter electrodes coupled to energize said load upon the forward biasing of the base-emitter junction thereof, a light actuable transistor coupled in forward biasing relationship with said switching means and a lamp coupled with said transistor switching means and energizable thereby simultaneously with the said energization of said load; and housing means for retaining said circuit and having a portion opaque to light adjacent said light actuable transistor, said opaque portion having an open passageway extending from an opening in said housing to said light actuable transistor and having lengthwise and widthwise dimensions for attenuating diffuse ambient light incident upon said opening to an extent precluding an actuation of said light actuable transistor thereby, means for mounting said lamp at a location spaced from said passageway opening and positioned with respect to said passageway for actuating by illumination said light actuable transistor, and an opaque flap mounted between said lamp and said opening and actuable by a current of air to move from a stable rest position to an unstable position over said opening to effect a transient blockage of light from said lamp incident upon said opening.

10. Apparatus for switching light emitting lamp between on and off conditions, comprising:

circuit means connectible through first and second input leads to a source of alternating current and including a triac switching means connected across said first and second leads and having a gate connected with said second lead and gateable to an on condition to pass both half wave components of said current to said lamp, and first and second light actuable silicon controlled rectifiers energizable from said first and second leads, coupled with said gate and actuable in the presence of light to gate said triac switching means to said on condition; and a housing retaining said circuit means and having a portion opaque to light adjacent said light actuable silicon controlled rectifier, said opaque housing portion being formed to define an open passageway extending form an opening in said housing to said first and second light actuable silicon controlled rectifiers, said passageway having lengthwise and widthwise dimensions for attenuating diffuse ambient light incident upon said opening to an extent precluding actuation of said first and second light actuable silicon controlled rectifiers by said ambient light, an opaque flap mounted adjacent said opening and movable from a stable rest position not blocking said opening to an unstable position over said opening to effect a blockage of light from said lamp incident upon said opening, said housing being configured for access to said flap by blowing air thereupon to effect said movement to said unstable position and for exposing said opening and passageway to illumination from said lamp when said flap is in said rest position.

11. Switching apparatus for switching a lamp between on and off conditions, comprising:

circuit means connectable through first and second input leads to a source of direct current and including transistor switching means having its collector and emitter coupled with said first and second leads for energizing said load upon the forward biasing of the base-emitter junction thereof and a light actuable transistor coupled in forward biasing relationship with said transistor switching means and actuable in the presence of light to forward bias the base-emitter junction of said transistor switching means; and a housing retaining said circuit means and having a portion opaque to light adjacent said light actuable transistor, said opaque housing portion being formed to define an open passageway extending from an opening in said housing to said light actuable transistor, said passageway having lengthwise and widthwise dimensions for attenuating diffuse ambient light incident upon said opening to an extent precluding actuation of said light actuable transistor by said ambient light, an opaque flap mounted adjacent said opening and movable from a stable rest position not blocking said opening to an unstable position over said opening to effect a blockage of light from said lamp incident upon said opening, said housing being configured for access to said flap by blowing air thereupon to effect said movement to said unstable position and for exposing said opening and passageway to illumination from said lamp when said flap is in said rest position.

12. The apparatus of claim 11 in which said passageway is formed having a lengthwise dimension of about 5/16 inch and a widthwise dimension of about ⅛ inch.

* * * * *